United States Patent
Van Der Lee et al.

(10) Patent No.: US 9,677,873 B2
(45) Date of Patent: Jun. 13, 2017

(54) APPARATUS, METHOD AND COMPUTER PROGRAM FOR DETERMINING A DISTANCE TO AN OBJECT USING A DETERMINED PEAK WIDTH OF A SELF-MIXING INTERFERENCE (SMI) SIGNAL

(75) Inventors: Alexander Marc Van Der Lee, Eindhoven (NL); Mark Carpaij, Eindhoven (NL)

(73) Assignee: KONINKLIJKE PHILIPS ELECTRONICS N.V., Eindhoven (NL)

( * ) Notice: Subject to any disclaimer, the term of this patent is extended or adjusted under 35 U.S.C. 154(b) by 193 days.

(21) Appl. No.: 13/811,397
(22) PCT Filed: Jul. 19, 2011
(86) PCT No.: PCT/IB2011/053212
§ 371 (c)(1),
(2), (4) Date: Jan. 22, 2013
(87) PCT Pub. No.: WO2012/014124
PCT Pub. Date: Feb. 2, 2012

(65) Prior Publication Data
US 2013/0120759 A1    May 16, 2013

(30) Foreign Application Priority Data
Jul. 26, 2010 (EP) .................. 10170732

(51) Int. Cl.
G01B 9/02    (2006.01)
G01B 11/14   (2006.01)
(Continued)

(52) U.S. Cl.
CPC .............. *G01B 11/14* (2013.01); *G01S 7/497* (2013.01); *G01S 7/4916* (2013.01); *G01S 17/32* (2013.01); *G01S 17/46* (2013.01)

(58) Field of Classification Search
CPC ............ G01B 9/02092; G01B 9/02097; G01B 9/02015
(Continued)

(56) References Cited

U.S. PATENT DOCUMENTS

| 7,557,795 B2 | 7/2009 | Kong |
| 7,920,249 B2 | 4/2011 | Heinks |
| 2007/0165130 A1 | 7/2007 | Cobben |

FOREIGN PATENT DOCUMENTS

| DE | 4400680 A1 | 7/1995 |
| WO | 2005106634 A1 | 11/2005 |

(Continued)

OTHER PUBLICATIONS

Giuliani G. et al "Laser Diode Self-Mixing Technique for Sensing Applications", Journel of Optics A: Pure and Applied Optics, Nov. 2002, vol. 4, No. 6, pp. 283-294.

(Continued)

*Primary Examiner* — Hwa Lee

(57) ABSTRACT

An apparatus, method and computer program for measuring a distance using a self-mixing interference (SMI) unit that generates an SMI signal. The SMI unit comprises a laser emitting a first laser beam directed to an object and wherein the SMI signal depends on an interference of the first laser beam and a second laser beam reflected by the object. A peak width determination unit determines a peak width of the SMI signal, and a distance determination unit determines a distance between the object and the SMI unit depending on the determined peak width of the SMI signal. Since the distance is determined depending on the peak width of the SMI signal, without requiring a laser driving current modulation, advanced electronics for modulating the driving current of the laser are not needed. This reduces the technical efforts needed for determining the distance.

13 Claims, 6 Drawing Sheets

(51) Int. Cl.
*G01S 7/497* (2006.01)
*G01S 17/32* (2006.01)
*G01S 17/46* (2006.01)
*G01S 7/491* (2006.01)

(58) Field of Classification Search
USPC .................................................. 356/498, 519
See application file for complete search history.

(56) References Cited

FOREIGN PATENT DOCUMENTS

| | | | |
|---|---|---|---|
| WO | 2009090593 | A1 | 7/2009 |
| WO | 2010001299 | A2 | 1/2010 |
| WO | 2010029484 | A1 | 3/2010 |
| WO | 2010106483 | A2 | 9/2010 |

OTHER PUBLICATIONS

Shinohara, S. et al Compact and High-Precision Range Finder with Wide Dynamic Range using one Sensor Head Instrumentation and Measurement Technology Conference. May 1991. vol. 8, pp. 126-130.

Tucker, John R. et al "The Effect of Multiple Transverse Modes in Self-Mixing Sensors based on Vertical-Cavity Surface-Emitting Lasers" COMMAD 04, 2005, pp. 323-326.

Yuyan, Zhang et al "Laser Doppler Velocimetry based on Self-Mixing Effect in Vertical-Cavity Surface-Emitting Lasers", The Eighth International Conference on Electronic Measurement and Instruments, 2007, pp. 1-413-1-416.

Onodera, Ribun et al "Effect of Laser-Diode Power Change on Optical Heterodyne Interferometry", Journal of Lightwave Technology, vol. 13, No. 4, Apr. 1995, pp. 675-681.

Donati, Silvano et al "Self-Mixing Techniques for Sensing Applications", Proceedings ODIMAP IV, Jun. 2004, pp. 213-234.

APPARATUS, METHOD AND COMPUTER PROGRAM FOR DETERMINING A DISTANCE TO AN OBJECT USING A DETERMINED PEAK WIDTH OF A SELF-MIXING INTERFERENCE (SMI) SIGNAL

FIELD OF THE INVENTION

The invention relates to an apparatus, a method and a computer program for measuring a distance. The invention relates further to a focusing apparatus for focusing a laser beam of an apparatus for measuring a distance.

BACKGROUND OF THE INVENTION

The article "Laser diode self-mixing technique for sensing applications" by G. Giuliani et al., Journal Of Optics A: Pure And Applied Optics, 2002, volume 4, pages 283 to 294, discloses an apparatus for measuring a distance, which uses self-mixing interference (SMI) for determining the distance. A laser comprising a cavity emits a first laser beam, which is directed to an object to which a distance should be determined. The first laser beam is reflected by the object and the reflected laser beam enters the cavity, in which the emitted laser beam and the reflected laser beam interfere. The interference generates an SMI signal, which is measured, while the current for driving the laser is modulated. The modulation of the driving current leads to a wavelength shift of the laser beam and a phase shift of the SMI signal, wherein the distance is determined based on the phase shift of the SMI signal and the wavelength shift.

Since for determining the distance the current for driving the laser has to be modulated, advanced electronics are needed, i.e. the technical efforts required for measuring the distance are relatively high.

SUMMARY OF THE INVENTION

It is an object of the present invention to provide an apparatus, a method and a computer program for measuring a distance, wherein the technical efforts can be reduced.

In a first aspect of the present invention, an apparatus for measuring a distance is presented, wherein the apparatus comprises:

an SMI unit for generating an SMI signal, wherein the SMI unit comprises a laser emitting a first laser beam for being directed to an object and wherein the SMI signal depends on an interference of the first laser beam and a second laser beam reflected by the object, a peak width determination unit for determining a peak width of the SMI signal, a distance determination unit for determining a distance between the object and the SMI unit depending on the determined peak width of the SMI signal.

Since the distance is determined depending on the peak width of the SMI signal, a distance can be determined without modulating a driving current of the laser for generating a wavelength shift of the laser beam and a phase shift of the SMI signal. Advanced electronics for modulating the driving current of the laser are therefore not needed. This reduces the technical efforts needed for determining the distance.

The peak width of the SMI signal is preferably the frequency width of the SMI signal.

It is preferred that the apparatus further comprises a normalization unit for normalizing the frequency dependence of the SMI signal to the frequency of a peak of the SMI signal, wherein the peak width determination unit is adapted to determine the peak width of the normalized SMI signal. The normalization reduces possible influences on the peak width of the SMI signal, which may not be indicative of the distance between the SMI unit and the object and which may therefore reduce the accuracy of determining the distance. The normalization can therefore lead to an improved accuracy of determining the distance between the SMI unit and the object.

It is further preferred that the apparatus is adapted to measure a distance within a predefined distance range, in which the distance depends linearly on the peak width. This allows determining the distance depending on the peak width in a relatively simple way by determining a linear relationship between the peak width and the distance and by using this linear relationship for determining the distance depending on the peak width. The linear relationship can be determined by, for example, calibration measurements, wherein the peak width is measured, while the distance between the object and the SMI unit is known.

Preferentially, the distance determination unit comprises an assignment between a) peak widths of the SMI signal and b) distances between the object and the SMI unit within a predefined distance range, wherein the distance determination unit is adapted to determine the distance between the object and the SMI unit depending on the determined peak width of the SMI signal and the assignment. The assignment describes preferentially the above mentioned linear relationship between the peak width and the distance and is preferentially determined by calibration measurements, wherein the peak width is measured, while the distance is known.

It is further preferred that the apparatus comprises a focusing unit for focusing the first laser beam, wherein focusing settings of the focusing unit are modifiable, wherein the distance determination unit comprises different assignments between a) peak widths of the SMI signal and b) distances between the object and the SMI unit in different predefined distance ranges, wherein the different assignments correspond to different focusing settings of the focusing unit and wherein the distance determination unit is adapted to determine the distance between the object and the SMI unit depending on the determined peak width of the SMI signal and the assignment which corresponds to the focusing settings of the focusing unit. The focusing unit preferentially comprises a lens, wherein the focusing settings can be defined by the distance between the laser and the lens and/or by characteristics of the lens like the curvature of the lens. Since the peak width determination unit comprises different assignments between a) peak widths of the SMI signal and b) distances between the object and the SMI unit in different predefined distance ranges, wherein the different assignments correspond to different focusing settings of the focusing unit, the focusing settings of the focusing unit can be modified such that the assignment, which corresponds to the modified focusing settings, is an assignment between peak widths and distances in a desired predefined distance range. Thus, if the apparatus should be used for measuring distances in a certain distance range, the focusing settings of the focusing unit can be modified such that the apparatus is operable in the certain distance range.

It is further preferred that the apparatus comprises a feedback independent regime detection unit for detecting whether the apparatus is in a feedback independent regime in which the peak width is independent of the intensity of the second laser beam. Preferentially, the distance determination unit is adapted to determine the distance, if the feedback independent regime detection unit detects that the apparatus is in the feedback independent regime. If the intensity of the reflected second laser beam, which has entered the cavity of the laser, is relatively large, the peak width of the SMI signal can depend on the intensity of the reflected second laser beam. In this case the apparatus would be in a feedback dependent regime. By determining whether the apparatus is in a feedback dependent regime or in a feedback independent regime, i.e. by determining whether the peak width of the SMI signal depends on the intensity of the reflected second laser beam, which has entered the cavity, or not, and by determining the distance only, if the apparatus is in the feedback independent regime, the distance can be determined with improved accuracy.

It should be noted that the feedback independent regime only defines a regime, in which the width of the peak of the SMI signal does not depend on the intensity of the reflected second laser beam. However, also in the feedback independent regime the SMI signal is of course generated by a feedback, i.e. by an interference of the first laser beam and the reflected second laser beam within the cavity of the laser.

It is further preferred that the feedback independent regime detection unit is adapted to detect whether the apparatus is in the feedback independent regime depending on an amplitude of the SMI signal. For example, the feedback independent regime detection unit can be adapted to detect that the apparatus is in the feedback indepenent regime, if the amplitude of the SMI signal is smaller than a predefined threshold. This allows determining whether the apparatus is in the feedback indepent regime in a relatively simple way.

It is further preferred that the apparatus comprises an attenuator for attenuating the second laser beam, wherein the feedback independent regime detection unit is adapted to detect whether the apparatus is in the feedback independent regime, depending on a peak width, which is measured while the attenuation of the second laser beam is modified by the attenuator. In the feedback independent regime, the peak width of the SMI signal does not depend on the intensity of the reflected second laser beam. Thus, if the peak width is not modified while the attenuation of the second laser beam is modified by the attenuator, the feedback independent regime detection unit can detect that the apparatus is in the feedback independent regime. This also allows determining whether the apparatus is in the feedback independent regime in a relatively simple way.

It is further preferred that the apparatus comprises an attenuator for attenuating the second laser beam, wherein the attenuator is adapted to actively modify the attenuation of the second laser beam depending on the detection whether the apparatus is in the feedback independent regime. It is further preferred that the attenuator is adapted to increase the attenuation of the second laser beam, if the apparatus is not in the feedback independent regime. Thus, the attenuator can be controlled such that the apparatus remains in or goes back to the feedback independent regime, wherein, if the apparatus intends to leave the feedback independent regime or has already left the feedback independent regime, the attenuation of the second laser beam is modified such that the apparatus remains in the feedback independent regime or goes back into the feedback independent regime, respectively.

It is further preferred that the apparatus comprises an output unit for outputting an output signal indicating that the apparatus is in the feedback independent regime, if the feedback independent regime detection unit detects that the apparatus is in the feedback independent regime, or indicating that the apparatus is not in the feedback independent regime, if the feedback independent regime detection unit detects that the apparatus is not in the feedback independent regime. It can therefore be output to a user, whether the apparatus is in a feedback independent regime or a feedback dependent regime, thereby giving the user an indication with respect to the accuracy of the determined distance and/or thereby allowing the user to decide, whether he wants to measure the distance, if the apparatus is in the feedback independent regime or in the feedback dependent regime.

It is also preferred that the apparatus comprises:
a focusing unit for focusing the first laser beam, and
a control unit for controlling the focusing unit depending on the determined distance. This allows using the apparatus as a focus apparatus, in particular, as an autofocus apparatus. For example, the control unit can be adapted to control the focusing unit such that the determined distance remains constant, wherein it is assumed that, if the distance is constant, the object remains in the same position with respect to the focus of the first laser beam.

In a further aspect of the invention a focusing apparatus is presented, wherein the focusing apparatus comprises:
an SMI unit for generating an SMI signal, wherein the SMI unit comprises a laser emitting a first laser beam for being directed to an object and wherein the SMI signal depends on an interference of the first laser beam and a second laser beam reflected by the object,
a peak width determination unit for determining a peak width of the SMI signal,
a focusing unit for focusing the first laser beam, and
a control unit for controlling the focusing unit depending on the determined peak width.

It is preferred that the control unit is adapted to control the focusing unit such that the peak width of the SMI signal remains constant. If the peak width of the SMI signal is constant, the position of the object with respect to the focus of the first laser beam is not modified. By controlling the focusing unit such that the peak width of the SMI signal remains constant, it can therefore be ensured that the object remains at the same position with respect to the focus, in particular, remains within the focus.

In a further aspect of the present invention a method for measuring a distance is presented, wherein the method comprises:
generating an SMI signal by an SMI unit, wherein the SMI unit comprises a laser emitting a first laser beam for being directed to an object and wherein the SMI signal depends on an interference of the first laser beam and a second laser beam reflected by the object,
determining a peak width of the SMI signal by a peak width determination unit,
determining a distance between the object and the SMI unit depending on the determined peak width of the SMI signal by a distance determination unit.

In a further aspect of the present invention a focusing method is presented, wherein the focusing method comprises:
generating an SMI signal by an SMI unit, wherein the SMI unit comprises a laser emitting a first laser beam for being directed to an object and wherein the SMI signal depends on an interference of the first laser beam and a second laser beam reflected by the object,
determining a peak width of the SMI signal by a peak width determination unit,
focusing the first laser beam by a focusing unit, and controlling the focusing unit depending on the determined peak width by a control unit.

In a further aspect of the present invention a computer program for measuring a distance is presented, wherein the computer program comprises program code means for causing an apparatus to carry out the steps of a method when the computer program is run on a computer controlling the apparatus.

In a further aspect of the present invention a focusing computer program is presented. The focusing computer program comprises program code means for causing a focusing apparatus to carry out the steps of the above mentioned focusing method, when the focusing computer program is run on a computer controlling the focusing apparatus.

It shall be understood that the apparatus for measuring a distance, the focusing apparatus, the method for measuring a distance, the above mentioned focusing method, the computer program and the above mentioned focusing computer program have similar and/or identical preferred embodiments as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
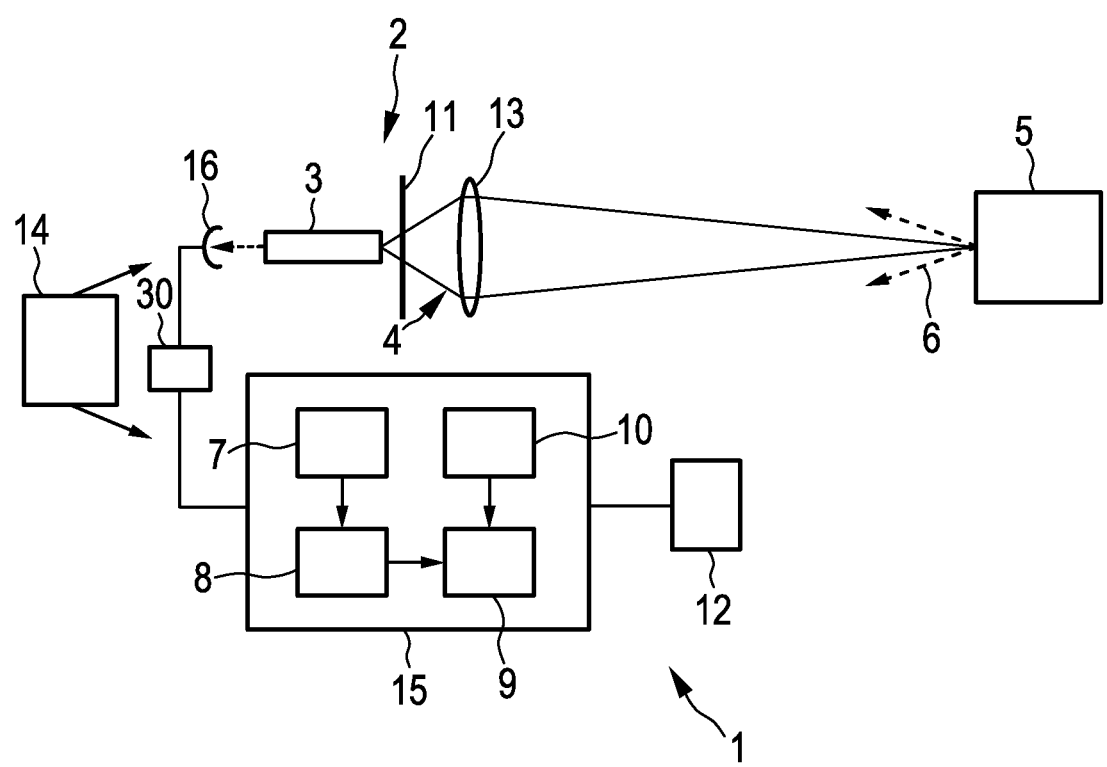
FIG. 1 shows schematically and exemplarily an embodiment of an apparatus for measuring a distance.

FIG. 1 shows schematically and exemplarily an apparatus for measuring a distance. The apparatus 1 comprises an SMI unit 2 for generating an SMI signal. The SMI unit 2 comprises a laser 3 for emitting a first laser beam 4, which is focused by a focusing unit 13 and directed to an object 5. The first laser beam 4 is reflected by the object 5 and the reflected light 6, which can be regarded as a second laser beam, enters a cavity of the laser 3 and interferes with the laser light within the cavity for generating the SMI signal. The cavity of the laser 3 is adapted such that a part of the laser light can leave the cavity in the direction of a detector 16 for detecting this laser light. For example, a resonant mirror of the cavity can be slightly transparent to the laser light, in order to allow a part of the laser light to leave the cavity. The detected intensity of the laser light is modulated, wherein the modulation is caused by the SMI within the cavity. The intensity modulation of the laser light is the SMI signal. For a more detailed description of the generation of the SMI signal reference is made to, for example, the above mentioned article by G. Giuliani et al., which is herewith incorporated by reference.

For determining the intensity modulation of the detected laser light the SMI unit 2 comprises a modulation determination unit 30. The modulation determination unit 30 can be adapted to analogously determine the intensity modulation or to digitize the detected laser light for generating a digital laser light signal and to digitally determine the intensity modulation from the digital laser light signal.

The generated SMI signal is provided to a signal processing unit 15, which comprises a normalization unit 7. The normalization unit 7 is adapted to normalize the frequency dependence of the SMI signal to the frequency of a peak of the SMI signal.

The peak of the SMI signal in the frequency domain is a Doppler peak caused by a Doppler shift of the frequency of the reflected second laser beam.

Figure 2:
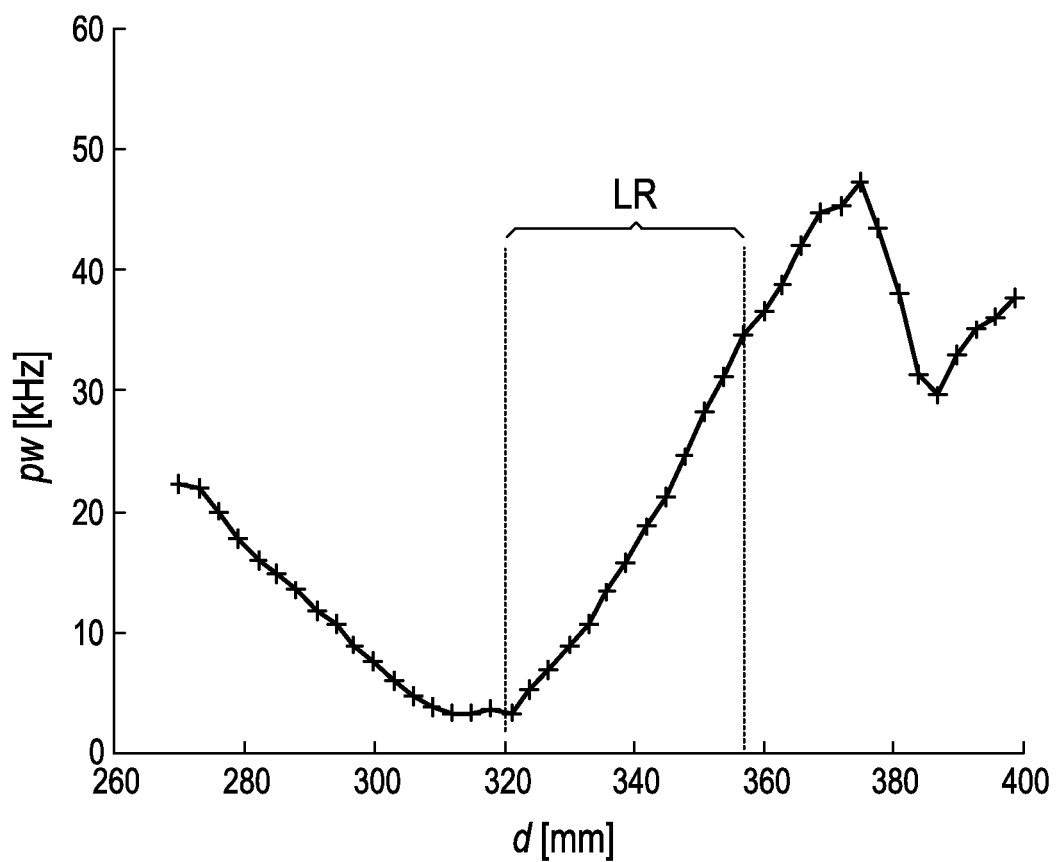
FIG. 2 shows schematically and exemplarily a dependence of a peak width of an SMI signal on a distance between an SMI unit of the apparatus and an object.

The signal processing unit 15 further comprises a peak width determination unit 8 for determining the width of the peak of the normalized SMI signal. The peak of the normalized SMI signal is a peak in the frequency spectrum of the normalized SMI signal and the peak width of the peak is the frequency width of the peak of the SMI signal. The signal processing unit 15 further comprises a distance determination unit 9 for determining the distance between the object 5 and the SMI unit 2 depending on the determined peak width of the SMI signal. A relation between the peak width and the distance can be determined by calibration measurements, wherein the peak width is measured, while the distance between the SMI unit and the object is known. A corresponding calibration curve is schematically and exemplarily shown in FIG. 2. In FIG. 2, the calibration curve shows the dependence of the peak width pw in kHz on the distance d in mm between the SMI unit 2 and the object 5. The calibration curve comprises a linear region LR, in which the peak width depends substantially linearly on the distance.

Figure 3:
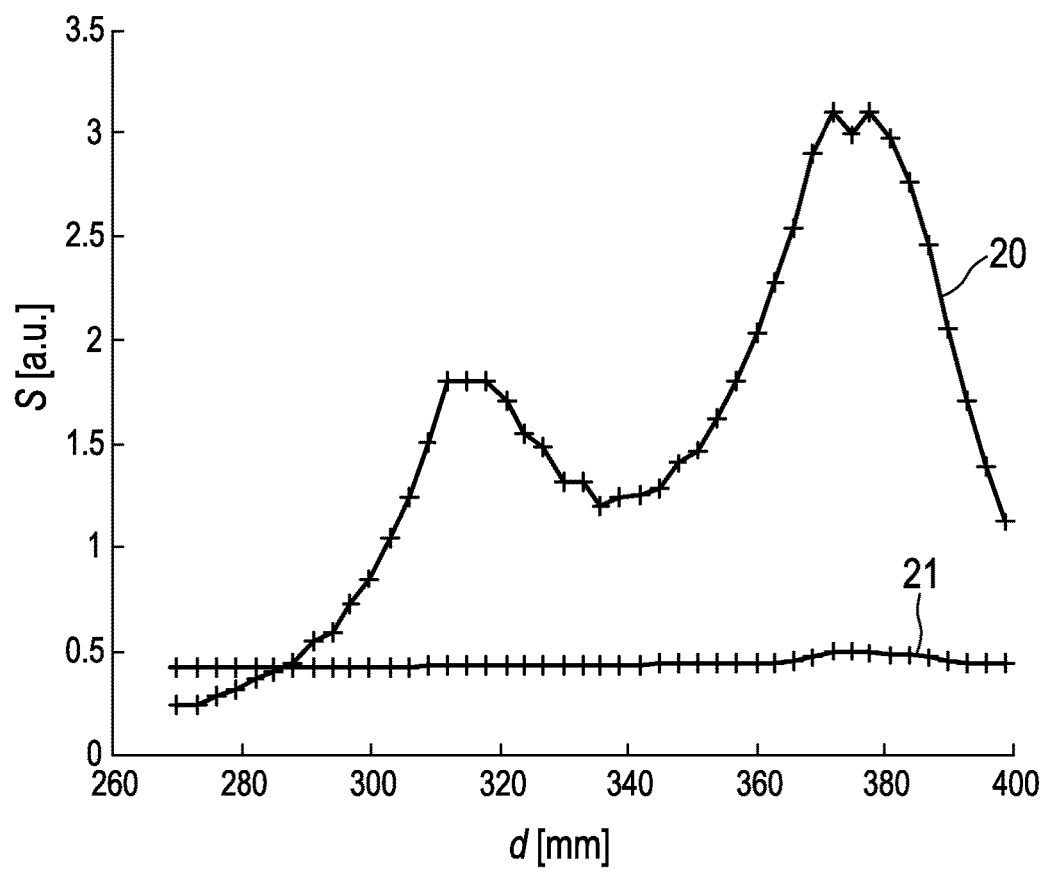
FIG. 3 shows schematically and exemplarily the strength of an SMI signal in comparison to the noise level.

FIG. 3 shows schematically and exemplarily the dependence of the strength S of the SMI signal 20 and the strength of the noise 21, i.e. the height of the peak of the SMI signal and the noise level, in arbitrary units depending on the distance d between the SMI unit and the object in mm. As can be seen in FIG. 3, in the linear range, which is indicated in FIG. 2, the peak height is much larger than the noise level. The peak width can therefore very well be determined from the SMI signal.

The linear region LR of the calibration curve defines an assignment between a) peak widths of the SMI signal and b) distances between the object 5 and the SMI unit 2 within a predefined distance range. The predefined distance range is the distance range within the linear region LR of the calibration curve. The distance determination unit 9 is adapted to determine the distance between the object 5 and the SMI unit 2 depending on the determined peak width of the SMI signal and the assignment.

In an embodiment, the focusing unit 13 has modifiable focusing settings. For example, the focusing unit 13 can be adapted such that the distance between a focusing lens of the focusing unit 13 and the laser 3 and/or a curvature of a focusing lens can be modified. The distance determination unit 9 can then comprise different assignments between a) peak widths of the SMI signal and b) distances between the object 5 and the SMI unit 2 in different predefined distance ranges, wherein the different assignments correspond to different focusing settings of the focusing unit and wherein the distance determination unit 9 can be adapted to determine the distance between the object 5 and the SMI unit 2 depending on the determined peak width of the SMI signal and the assignment which corresponds to the actual focusing settings of the focusing unit 13. The assignments are preferentially linear regions of different calibration curves, which have been determined by measuring the peak width of the SMI signal for different known focusing settings and for different known distances. The linear regions of the different calibration curves correspond preferentially to different distance ranges, i.e. to different predefined distance ranges. Thus, by modifying the focusing settings of the focusing unit 13 the predefined distance range can be selected as desired.

The signal processing unit 15 further comprises a feedback independent regime detection unit 10 for detecting whether the apparatus 1 is in a feedback independent regime, in which the peak width is independent of the intensity of the second laser beam. The distance determination unit 9 is preferentially adapted to determine the distance only, if the feedback independent regime detection unit 10 detects that the apparatus 1 is in the feedback independent regime. In this embodiment, the feedback independent regime detection unit 10 is adapted to detect whether the apparatus 1 is in the feedback independent regime depending on the amplitude of the peak of the frequency spectrum of the SMI signal. If the amplitude is smaller than a predefined threshold, it is determined that the apparatus 1 is in the feedback independent regime. Also this predefined threshold can be determined by calibration measurements, wherein the amplitude of the peak is measured, while it is known whether the apparatus 1 is in the feedback independent regime or in the feedback dependent regime.

The apparatus 1 further comprises an attenuator 11 for attenuating the second laser beam 6, wherein the feedback independent regime detection unit 10 can also be adapted to detect whether the apparatus 1 is in the feedback independent regime or in the feedback dependent regime depending on a peak width measured while the attenuation of the second laser beam 6 is modified by the attenuator 11.

In FIG. 1, the attenuator 11 is placed between the laser 3 and the focusing unit 13. In another embodiment, the attenuator 11 can also be placed on the other side of the focusing unit 13, i.e. between the focusing unit 13 and the object 5. The attenuator 11 attenuates the first laser beam and the second laser beam. The attenuator 11 can be a variable grey filter, a continous variable LC cell, a polarizer in combination with a rotating quarterwave plate, or another kind of attenuator.

The attenuator 11 is adapted to actively modify the attenuation of the second laser beam 6 depending on the detection whether the apparatus 1 is in the feedback independent regime. In particular, the attenuator 11 is adapted to increase the attenuation of the second laser beam 6, if the apparatus is not in the feedback independent regime. Thus, if the feedback independent regime detection unit 10 detects that the apparatus 1 is not in the feedback independent regime, the attenuation of the second laser beam 6 is increased, in order to transfer the apparatus into the feedback independent regime.

The apparatus 1 further comprises an output unit 12 for outputting an output signal indicating that the apparatus 1 is in the feedback independent regime, if the feedback independent regime detection unit 10 detects that the apparatus 1 is in the feedback independent regime, or indicating that the apparatus 1 is not in the feedback independent regime, if the feedback independent regime detection unit 10 detects that the apparatus is not in the feedback independent regime. In this embodiment, the output unit 12 is a display. However, in other embodiments the output unit can also be another output unit like an acoustical output unit. Since it is output to the user whether the apparatus is in the feedback independent regime or in the feedback dependent regime, the user can decide, if he wants to measure the distance depending on whether the apparatus is in the feedback independent regime or in the feedback dependent regime.

The focusing unit 13 comprises preferentially a movable lens being movable with respect to the laser 3, in order to control the location of the focus of the first laser beam 4. For controlling the focusing unit 13 and other elements of the apparatus 1, the apparatus comprises a control unit 14. In an embodiment, the control unit 14 can be adapted to control the focusing unit 13 depending on the determined distance. It is assumed that, if the distance between the object 5 and the SMI unit 2 is constant, the relative position of the object 5 with respect to the focus position of the first laser beam 4 is constant. Thus, the control unit 14 can be adapted to control the focusing unit 13 such that the relative position between the focus location of the first laser beam and the object remains constant, if the control unit 14 controls the focusing unit 13 such that the determined distance remains constant. For example, the control unit 14 can be adapted such that the apparatus 1 can be regarded as an autofocus apparatus, wherein the control unit 14 controls the focusing unit 13 depending on the determined distance such that the object 5 is and preferentially remains within the focus of the first laser beam 4. If the apparatus 1 is operated in such an autofocus mode, other features of the SMI signal not being the peak width can be used for determining, for example, the velocity of the object 5. For instance, the Doppler frequency can be extracted from the SMI signal and the velocity of the object 5 can be determined depending on the extracted Doppler frequency.

The control unit 14 is adapted to control the entire apparatus 1, in particular, the SMI unit 2, the attenuator 11, the focusing unit 13, the signal processing unit 15 and the display 12.

Figure 4:
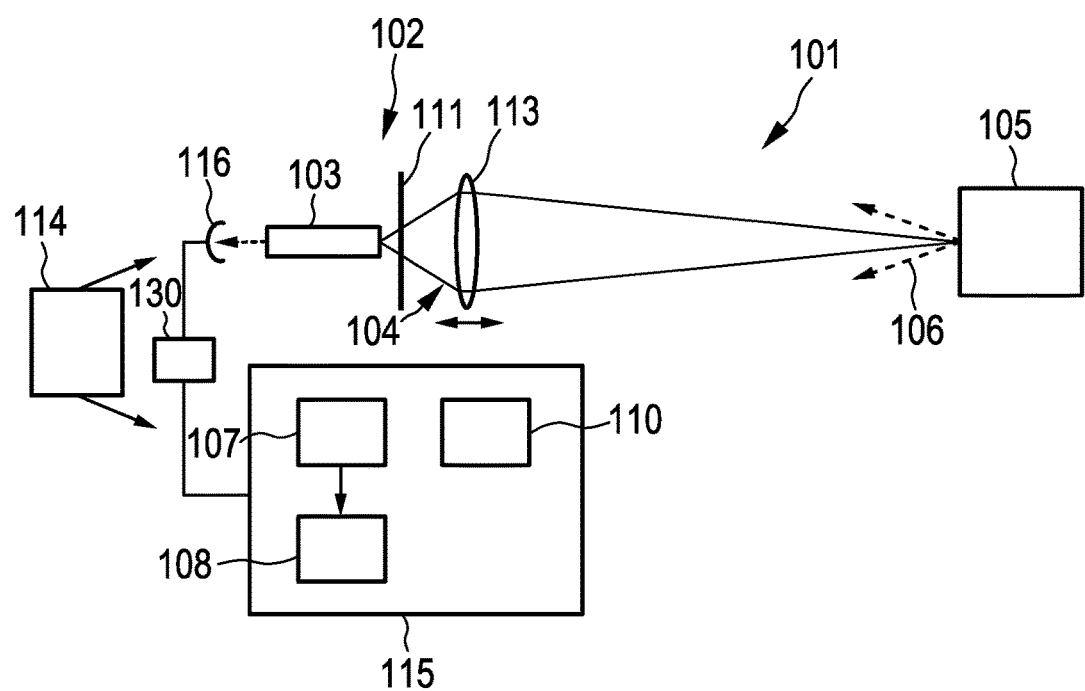
FIG. 4 shows schematically and exemplarily an embodiment of a focusing apparatus.

FIG. 4 shows schematically and exemplarily a further embodiment of a focusing apparatus. The focusing apparatus 101 comprises an SMI unit 102 with a laser 103 for emitting a first laser beam 104, a detector 116 and a modulation determination unit 130 for determining the intensity modulation of the detected laser light. The SMI unit 102 is similar to the SMI unit 2 described above with reference to FIG. 1.

The SMI signal generated by the SMI unit 102 is provided to a signal processing unit 115. The signal processing unit 115 comprises a normalization unit 107 for normalizing the generated SMI signal as described above with reference to FIG. 1. Moreover, the signal processing unit 115 comprises a peak width determination unit 108 for determining the frequency peak width of the SMI signal, i.e. the width of the peak in the frequency spectrum of the SMI signal. A control unit 114 controls the SMI unit 102, the focusing unit 113 and the signal processing unit 115. In particular, the control unit 114 is adapted to control the focusing unit 113 such that the peak width of the SMI signal remains constant. For example, the focusing unit 113 can comprise a focusing lens, wherein the distance between the focusing lens and the laser of the SMI unit 102 can be controlled such that the peak width of the SMI signal remains constant. By ensuring that the peak width of the SMI signal remains constant, the relative position of the object with respect to the focus location of the first laser beam 104 can be maintained. The focusing apparatus 101 can therefore be used as an autofocus apparatus, which tries to maintain the object 105 within the focus of the first laser beam 104.

Also the focusing apparatus 101 comprises a feedback independent regime detection unit 110 for determining whether the focusing apparatus 101 is in the feedback independent regime or in the feedback dependent regime, wherein the control unit 114 is adapted to control an attenuator 111 such that the focusing apparatus 1 is in the feedback independent regime. As already described above with reference to FIG. 1, the amplitude of the SMI signal, i.e. the amplitude of the peak in the frequency spectrum of the SMI signal, and/or the dependence of the peak width on the attenuation of the second laser beam can be used for determining whether the focusing apparatus 101 is in the feedback independent regime or in the feedback dependent regime. If the feedback independent regime detection unit 110 detects that the focusing apparatus 101 is not in the feedback independent regime, preferentially the attenuation of the second laser beam 106 is increased, in order to transfer the focusing apparatus into the feedback independent regime.

If a focusing apparatus 101 is used for ensuring that the relative position of the object with respect to the focus location of the first laser beam is maintained or at least within a predefined range, other features of the SMI signal not being the peak width can be used for determining other characteristics. For example, the Doppler frequency can be extracted from the SMI signal and the velocity of the object can be determined from the Doppler frequency.

Figure 5:
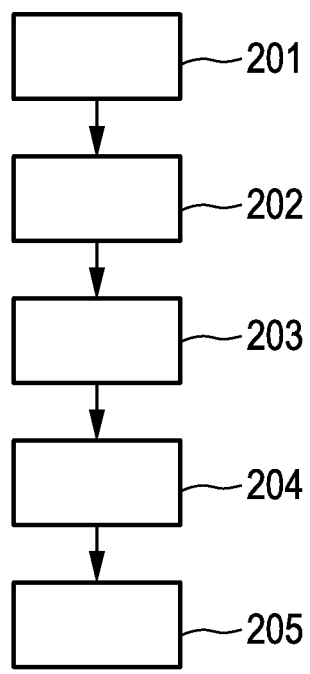
FIG. 5 shows a flowchart exemplarily illustrating a method for measuring a distance.

In the following an embodiment of a method for measuring a distance will exemplarily be described with reference to a flowchart shown in FIG. 5.

In step 201, an SMI signal is generated by the SMI unit 2, wherein the first laser beam 4 of the laser 3 is focused by the focusing unit 13 and directed to the object 5 and wherein the SMI signal depends on an interference of the first laser beam 4 with a second laser beam 6 reflected by the object 5. In step 202, the frequency spectrum of the SMI signal is normalized to the frequency of the peak of the SMI signal by the normalization unit 7, and, in step 203, a frequency peak width of the SMI signal is determined by the peak width determination unit 8. In step 204, the distance between the object 5 and the SMI unit 2 is determined depending on the determined frequency peak width of the SMI signal by the distance determination unit 9. In step 205, the determined distance is shown on a display of the output unit 12.

Figure 6:
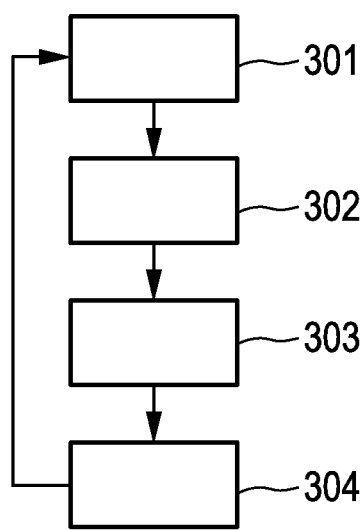
FIG. 6 shows a flowchart exemplarily illustrating a focusing method

In the following an embodiment of a focusing method will exemplarily be described with reference to a flowchart shown in FIG. 6.

In step 301, an SMI signal is generated by the SMI unit 102, wherein the laser 103 emits a first laser beam 104, which is focused by the focusing unit 113 and directed to the object 105, and wherein the SMI signal depends on an interference of the first laser beam 104 and a second laser beam 106 reflected by the object 105. In step 302, the frequency spectrum of the SMI signal is normalized to the frequency of the peak of the SMI signal in the frequency spectrum by the normalization unit 107. In step 303, a frequency peak width of the SMI signal in the frequency spectrum is determined by the peak width determination unit 108 and this determined frequency peak width is provided to the control unit 114 for controlling the focusing unit 113 depending on the determined frequency peak width in step 304. Steps 301 to 304 are preferentially performed in a loop, in order to continuously control the focusing unit 113 such that the object 105 remains in a desired position with respect to the location of the focus of the first laser beam, in particular, in order to ensure that the object 105 remains in the focus of the first laser beam 104.

The peak width of the SMI signal is the frequency peak width of the Doppler peak of the SMI signal, and the distance between the SMI unit and the object is preferentially the distance between the laser of the SMI unit and the object. The Doppler peak is generated by mixing the second laser beam being a Doppler shifted electromagnetic wave and the first laser beam being an undisturbed wave within the laser cavity.

As already mentioned in the beginning, conventionally a modulation of the laser current is needed to measure the distance between an object and a laser, if a prior art SMI laser sensor is used. The modulation scheme requires advanced electronics, in particular, advanced analogue electronics, and distortions of the modulation scheme lead to inaccuracies in the distance measurement. The apparatus for measuring a distance, which has been described above and which can also be regarded as a laser-SMI sensor, can be driven by a DC current source, thereby requiring less advanced electronics and improving the accuracy of the distance measurement.

The laser is preferentially a vertical-cavity surface-emitting laser (VCSEL). Instead of using an external detector like an external photodiode for generating the SMI signal, the laser can also comprise a built-in photodiode for generating the SMI signal, in particular, the SMI unit can comprise a VCSEL with a built-in photodiode.

The lens of the focusing unit can be an achromatic doublet having a focal length of, for example, 20 mm. However, the focusing unit can also comprise another kind of lens, for example, not being a doublet.

The peak of the SMI signal, i.e. the peak of the SMI signal in the frequency spectrum, is typically a Gaussian peak. The peak width determination unit can be adapted to fit a Gaussian function to the peak and to determine the frequency peak width from the peak width of the fitted Gaussian function.

Since the second laser beam can comprise a speckle nature, which can lead to a continuously varying peak width, the peak width can be time averaged, wherein the time averaged peak width can be used for, for example, a) determining the distance, b) determining whether the apparatus is in the feedback independent regime or in the feedback dependent regime and/or c) controlling the focusing unit. For averaging the peak width determined peak widths within a time period are used, wherein this time period is preferentially defined such that the above mentioned continuous variations of the peak width are averaged out.

The apparatus for measuring the distance and the focusing apparatus are preferentially operable for measuring distances which correspond to the linear region of the peak width versus distance curve, i.e. of the above mentioned assignments or calibration curves of which an example is shown in FIG. 2. If the peak width is inside the linear region, the spot size of the first laser beam is not necessarily smallest at the surface of the object.

The laser output signal is detected by the separate detectors 16, 116, which can be integrated into the laser stack or which can be external. The measured laser output signal contains the SMI signal, which can be converted to the digital domain by, for example, the modulation determination unit 30, 130 or a unit of the signal processing unit 15, 115 and which can then be processed by the units of the signal processing unit 15, 115. The normalization unit 7, 107 extracts the Doppler peak frequency and normalizes the laser output signal, wherein the peak width determination unit 8 determines the width of the Doppler peak of the normalized laser output signal in the frequency domain as the peak width of the SMI signal.

The focusing apparatus uses preferentially an actuated lens as the focusing unit and a control loop to maintain focus. Due to possible distance variations between the object and the laser, the laser beam can get out of focus, and, when the distance between the laser and the object is too large, the SMI signal can get below a detection threshold. To circumvent this, the focusing unit preferentially comprises an actuated lens, which can be displaced such that the peak width of the SMI signal stays at a certain value, preferably midway in the linear range of the peak width versus distance curve. If the distance to the object is within the linear range of the peak width versus distance curve, the control unit preferentially extracts an error signal to steer the movement of the lens. For example, if a distance is within the linear range, a difference between a reference peak width and an actually measured peak width is proportional to the corresponding displacement of the object. The difference between the reference peak width and the actually measured peak width can therefore be used as the error signal which can be applied in a feedback loop or in a feedforward loop to the focusing unit such that the error signal is minimized.

Although in an above described embodiment the distance determination unit comprises different assignments for different focusing settings of the focusing unit, the distance determination unit can also comprise different assignments for other different characteristics of the measurement of the distance, which may be changed. For example, the distance determination unit can comprise different assignments between a) peak widths of the SMI signal and b) distances between the object and the SMI unit for different angles of incidence, wherein the angle of incidence is defined as the angle between the first laser beam and the surface of the object, on which the first laser beam is directed. In this case, for determining the angle of incidence, an angle of incidence determination unit can be provided. For example, the angle of incidence measuring unit can be adapted to measure the distance to three different locations on the surface of the object in three different directions by one or several distance measurement units. The one or several distance measurement units can comprise a laser for optically measuring the distances in a known way. The three distances in the three known directions define the orientation of the surface of the object and can therefore be used by the angle of incidence determination unit for determining the orientation of the surface. Since the orientation of this surface of the object with respect to the SMI unit is then known and since also the position of the first laser beam is known, the angle of incidence can be determined based on this orientation of the surface and the position of the first beam by the angle of incidence determination unit.

The apparatus for measuring a distance and/or the focusing apparatus can be integrated into several products. For example, the apparatus for measuring a distance and/or the focusing apparatus can be used in laser mouse products, speed overground sensors for automotive, et cetera. However, the apparatus for measuring a distance and the focusing apparatus can also be used as standalone systems, without being incorporated into another apparatus.

Although it has been mentioned above that the laser is preferentially a VCSEL, the SMI unit can also comprise another kind of laser, for example, an edge emitting laser, a gas laser, a fiber or solid state laser, et cetera.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Conversions like converting an analog laser output signal to a digital signal, calculations like the normalization of the SMI signal, determinations like the determination of the peak width or of the distance, performed by one or several units or devices, can be performed by any other number of units or devices. For example, steps 202 to 204 or steps 302 to 304 can be performed by a single unit or by any other number of different units. The conversions, calculations, determinations and/or the control of the apparatus for measuring a distance in accordance with the above described method for measuring a distance and/or of the focusing apparatus in accordance with the above mentioned focusing method, can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an apparatus for measuring a distance. A self-mixing interference (SMI) unit generates an SMI signal, wherein the SMI unit comprises a laser emitting a first laser beam for being directed to an object and wherein the SMI signal depends on an interference of the first laser beam and a second laser beam reflected by the object. A peak width determination unit determines a peak width of the SMI signal, and a distance determination unit determines a distance between the object and the SMI unit depending on the determined peak width of the SMI signal. Since the distance is determined depending on the peak width of the SMI signal, without requiring a laser driving current modulation, advanced electronics for modulating the driving current of the laser are not needed. This reduces the technical efforts needed for determining the distance.

The invention claimed is:

1. An apparatus for measuring a distance, the apparatus comprising:
a self-mixing interference (SMI) unit comprising a laser configured to emit a first laser beam directed to an object, a cavity SMI positioned to receive a portion of the first laser beam and a second laser beam as a reflection of the first laser beam from the object, and a detector configured to generate an SMI signal based on an interference of the portion of the first laser beam by the second laser beam;
a distance measuring processor circuit coupled to the detector to receive the generated SMI signal, and coupled to a storage medium having instructions stored thereon, the distance measuring processor circuit configured by the instructions stored on the storage medium to:
determine a peak width of a frequency peak in a frequency spectrum of the received SMI signal,
determine a distance between the object and the SMI unit based on the determined peak width of the SMI signal and an assignment between peak widths of the SMI signal and distances between the object and the SMI unit within a predefined distance range in which the peak widths of the SMI signal varies substantially linearly with distances between the object and the SMI unit, and produce an output indicating the determined distance between the object and the SMI unit.

2. The apparatus of claim 1, wherein the distance measuring processor circuit is further configured by the instructions stored on the storage medium to calculate a normalized SMI signal from the received SMI signal and determine the peak width of the normalized SMI signal.

3. The apparatus of claim 1, wherein the distance measuring processor circuit is further configured by the instructions stored on the storage medium to calculate the distance within a plurality of predefined distance ranges in which the distance depends linearly on the peak width.

4. The apparatus of claim 1, further comprising a focusing unit positioned between the emitted first laser beam and the object to focus the first laser beam, wherein the focusing unit comprises modifiable focusing settings, wherein the distance measuring processor circuit comprises different assignments between a) peak widths of the SMI signal and b) distances between the object and the SMI unit in different predefined distance ranges, wherein the different assignments correspond to different focusing settings of the focusing unit and wherein the distance measuring processor circuit is coupled to receive the focus setting of the focusing unit and is configured by the instructions stored on the storage medium to determine the distance between the object and the SMI unit depending on the determined peak width of the SMI signal and the assignment which corresponds to the received focusing setting of the focusing unit.

5. The apparatus of claim 1, wherein the distance measuring processor circuit is configured by the instructions stored on the storage medium to detect whether the apparatus is in a feedback independent regime in which the peak width is independent of the intensity of the second laser beam.

6. The apparatus of claim 5, wherein the distance measuring processor circuit is configured by the instructions stored on the storage medium to only determine the distance when the feedback independent regime detection unit detects that the apparatus is in the feedback independent regime.

7. The apparatus of claim 5, wherein the distance measuring processor circuit is configured by the instructions stored on the storage medium to determine whether the apparatus is in the feedback independent regime based on an amplitude of the SMI signal being smaller than a predefined threshold.

8. The apparatus of claim 5, wherein the apparatus comprises an attenuator positioned to attenuate the second laser beam and wherein the distance measuring processor circuit is configured by the instructions stored on the storage medium to determine whether the apparatus is in the feedback independent regime based on a peak width measured while the attenuation of the second laser beam is modified by the attenuator.

9. The apparatus of claim 5, wherein the apparatus comprises an attenuator positioned to attenuate the second laser beam and wherein the attenuator is controlled to actively modify the attenuation of the second laser beam based on whether the apparatus is in the feedback independent regime.

10. The apparatus of claim 1, wherein the apparatus further comprises: a focusing unit positioned to focus the first laser beam, wherein the distance measuring processor circuit is coupled to the focusing unit and configured by the instructions stored on the storage medium to control the focusing unit depending on the determined distance.

11. A focusing apparatus comprising:
a self-mixing interference (SMI) unit comprising a laser configured to emit a first laser beam directed to an object, a cavity positioned to receive a portion of the first laser beam and a second laser beam as a reflection of the first laser beam from the object, and a detector configured to generate an SMI signal based on an interference of the portion of the first laser beam by the second laser beam;
a focusing unit positioned between the emitted first laser beam and the object to change a focus of the first laser beam;
a distance measuring processor circuit coupled to the detector to receive the generated SMI signal, coupled to the focusing unit to control the focus of the focusing unit and coupled to a storage medium having instructions stored thereon, the distance measuring processor circuit configured by the instructions stored on the storage medium to:
determine a peak width of a frequency peak in a frequency spectrum of the received SMI signal within a predefined distance range in which the peak widths of the SMI signal varies substantially linearly with distances between the object and the SMI unit,
control the focus of the focusing unit based on the determined peak width.

12. The focusing apparatus of claim 11, wherein the distance measuring processor circuit is configured by the instructions stored on the storage medium to control the focusing unit such that the peak width of the SMI signal remains constant.

13. A method for measuring a distance, the method performed by a distance measuring processor circuit coupled to a storage medium having instructions stored thereon, the distance measuring processor circuit configured by the instructions stored on the storage medium to:
control emission of a first laser beam from a self-mixing interference (SMI) unit directed to an object;
receive a portion of the first laser beam and a second laser beam as a reflection of the first laser beam from the object;
generate an SMI signal based on an interference of the portion of the first laser beam by the second laser beam;
determining a peak width of a frequency peak in a frequency spectrum of the SMI signal,
determine a distance between the object and the SMI unit based on the determined peak width of the SMI signal and an assignment between peak widths of the SMI signal and distances between the object and the SMI unit within a predefined distance range in which the peak widths of the SMI signal varies substantially linearly with distances between the object and the SMI unit, and
produce an output indicating the determined distance between the object and the SMI unit.

* * * * *